US009667927B2

(12) United States Patent
Takehana

(10) Patent No.: US 9,667,927 B2
(45) Date of Patent: May 30, 2017

(54) PROJECTOR

(71) Applicant: SEIKO EPSON CORPORATION, Tokyo (JP)

(72) Inventor: Naoto Takehana, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 38 days.

(21) Appl. No.: 14/591,257

(22) Filed: Jan. 7, 2015

(65) Prior Publication Data

US 2015/0201171 A1    Jul. 16, 2015

(30) Foreign Application Priority Data

Jan. 15, 2014   (JP) ................. 2014-004896

(51) Int. Cl.
  *G03B 21/14*  (2006.01)
  *H04N 9/31*   (2006.01)
  *H04N 5/74*   (2006.01)

(52) U.S. Cl.
  CPC ........... *H04N 9/317* (2013.01); *G03B 21/142* (2013.01); *G03B 21/147* (2013.01); *H04N 5/7441* (2013.01); *H04N 9/3185* (2013.01)

(58) Field of Classification Search
  CPC .... G03B 21/142; G03B 21/147; G03B 21/14; H04N 9/317; H04N 9/3185; H04N 9/3194; H04N 5/7441
  USPC ..................... 353/69, 70, 101, 121
  See application file for complete search history.

(56) References Cited

U.S. PATENT DOCUMENTS

| 6,592,228 B1* | 7/2003 | Kawashima ........... G03B 21/11 348/745 |
| 7,484,854 B2 | 2/2009 | Miyasaka |
| 2005/0231820 A1 | 10/2005 | Miyasaka |
| 2011/0025988 A1* | 2/2011 | Haraguchi ........... H04N 9/3185 353/70 |
| 2011/0279789 A1* | 11/2011 | Gishi ................... H04N 9/3144 353/61 |
| 2012/0218523 A1 | 8/2012 | Mizuno et al. |
| 2013/0083298 A1 | 4/2013 | Yoshimura et al. |
| 2014/0176730 A1 | 6/2014 | Kaji et al. |

(Continued)

FOREIGN PATENT DOCUMENTS

| CN | 102650808 A | 8/2012 |
| CN | 103034030 A | 4/2013 |
| JP | 2005-269363 A | 9/2005 |

(Continued)

*Primary Examiner* — William C Dowling
*Assistant Examiner* — Ryan Howard
(74) *Attorney, Agent, or Firm* — Oliff PLC

(57) ABSTRACT

A projector according to an aspect includes a light source device, a light modulation device adapted to modulate light from the light source device to form image light, a projection optical system adapted to perform tilted projection of the image light input from the light modulation device to display an image, and a guide display section adapted to display a guide image used for fitting the image projected by the projection optical system to a screen, the guide image is provided with a focus adjustment pattern forming area disposed in a central portion in a direction perpendicular to a tilt direction in a peripheral zone on the tilt direction side, and a focus adjustment pattern is formed in the focus adjustment pattern forming area.

11 Claims, 10 Drawing Sheets

(56) References Cited

U.S. PATENT DOCUMENTS

2014/0192332 A1 7/2014 Koyama et al.
2015/0234262 A1 8/2015 Yoshimura et al.

FOREIGN PATENT DOCUMENTS

| JP | 2006-178369 A | 7/2006 |
| JP | 2007-264335 A | 10/2007 |
| JP | 2013-044854 A | 3/2013 |
| JP | 2013-168922 A | 8/2013 |

* cited by examiner

PROJECTOR

BACKGROUND

1. Technical Field

The present invention relates to a projector.

2. Related Art

There has been proposed a projector for displaying a guide image including a figure for making tilt and deformation of an image to be projected easy to recognize (e.g., JP-A-2013-44854 (Document 1)).

In such a projector as described in Document 1, the user can adjust an installation state of the projector using a shape, a size, tilt, and so on of a test pattern included in the guide image as a guide.

Incidentally, it is common for the user to adjust the focus with reference to an image such as a menu screen displayed in a central portion of the screen. Here, in the case in which tilted projection of the image to be displayed is performed, the focus depth as a range in which defocus is allowed is shallower in an end portion on the tilt direction side compared to the focus depth in the central portion of the image. Therefore, if the adjustment is performed with reference to the menu screen displayed in the central portion of the screen so as to achieve the focus, there is a problem that the focus runs off the range of the focus depth in the end portion on the tilt direction side, and thus, the image blurs. Therefore, it has been difficult to adjust the focus of the image, the tilted projection of which is performed.

SUMMARY

An advantage of some aspects of the invention is to provide a projector making it possible to easily adjust the focus of the entire image, the tilted projection of which is performed.

A projector according to an aspect of the invention includes a light source device, a light modulation device adapted to modulate light from the light source device to form image light, a projection optical system adapted to perform tilted projection of the image light input from the light modulation device to display an image, and a guide display section adapted to display a guide image used for fitting the image projected by the projection optical system to a screen, the guide image is provided with a focus adjustment pattern forming area disposed in a central portion in a direction perpendicular to a tilt direction in a peripheral zone on the tilt direction side, and a focus adjustment pattern is formed in the focus adjustment pattern forming area.

With the projector according to the aspect of the invention, the focus adjustment pattern is disposed in the peripheral zone on the tilt direction side with a shallow focus depth in the guide image. Therefore, by adjusting the focus of the image with reference to the focus adjustment pattern, the focus of the entire image, the tilted projection of which is performed, can easily be adjusted.

Further, with the projector according to the aspect of the invention, since the focus adjustment pattern is provided to the guide image for fitting the image to the screen, the focus adjustment can be achieved at the same time when adjusting the image so as to fit to the screen. Therefore, with the projector according to the aspect of the invention, the focus adjustment can be performed without switching the screen from the guide image, which is easy and convenient.

The projector according to the aspect of the invention may be configured such that the focus adjustment pattern includes a line segment intersecting with a tangential direction.

According to this configuration, the focus adjustment can easily be performed.

The projector according to the aspect of the invention may be configured such that the line segment is perpendicular to the tangential direction.

According to this configuration, the focus adjustment can more easily be performed.

The projector according to the aspect of the invention may be configured such that the guide image has a rectangular shape, and the guide image includes an auxiliary pattern adapted to supplement a focus adjustment disposed on four corners of the guide image.

According to this configuration, since it is possible to fine-tune the overall focus balance, the accuracy of the focus adjustment can be improved.

The projector according to the aspect of the invention may be configured such that the auxiliary pattern includes a line segment intersecting with a tangential direction.

According to this configuration, the fine tuning of the focus balance can easily be performed.

The projector according to the aspect of the invention may be configured such that the focus adjustment pattern is larger than the auxiliary pattern.

According to this configuration, it is easy to visually recognize the focus adjustment pattern.

The projector according to the aspect of the invention may be configured such that the guide image includes a non-focus adjustment pattern forming area disposed in a central portion of the guide image.

According to this configuration, it is possible to inhibit the user from achieving the focus in the central portion of the image to perform the focus adjustment of the whole of the image.

The projector according to the aspect of the invention may be configured such that the guide image includes a frame-like pattern surrounding the focus adjustment pattern.

According to this configuration, it is easier to visually recognize the focus adjustment pattern.

The projector according to the aspect of the invention may be configured such that the guide image includes a test pattern adapted to make a display state of the image easy to recognize.

According to this configuration, it is easy to fit the image to the screen.

The projector according to the aspect of the invention may be configured such that the projector is a short focus projector.

According to this configuration, a significant advantage can be obtained from the focus adjustment using the focus adjustment pattern.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
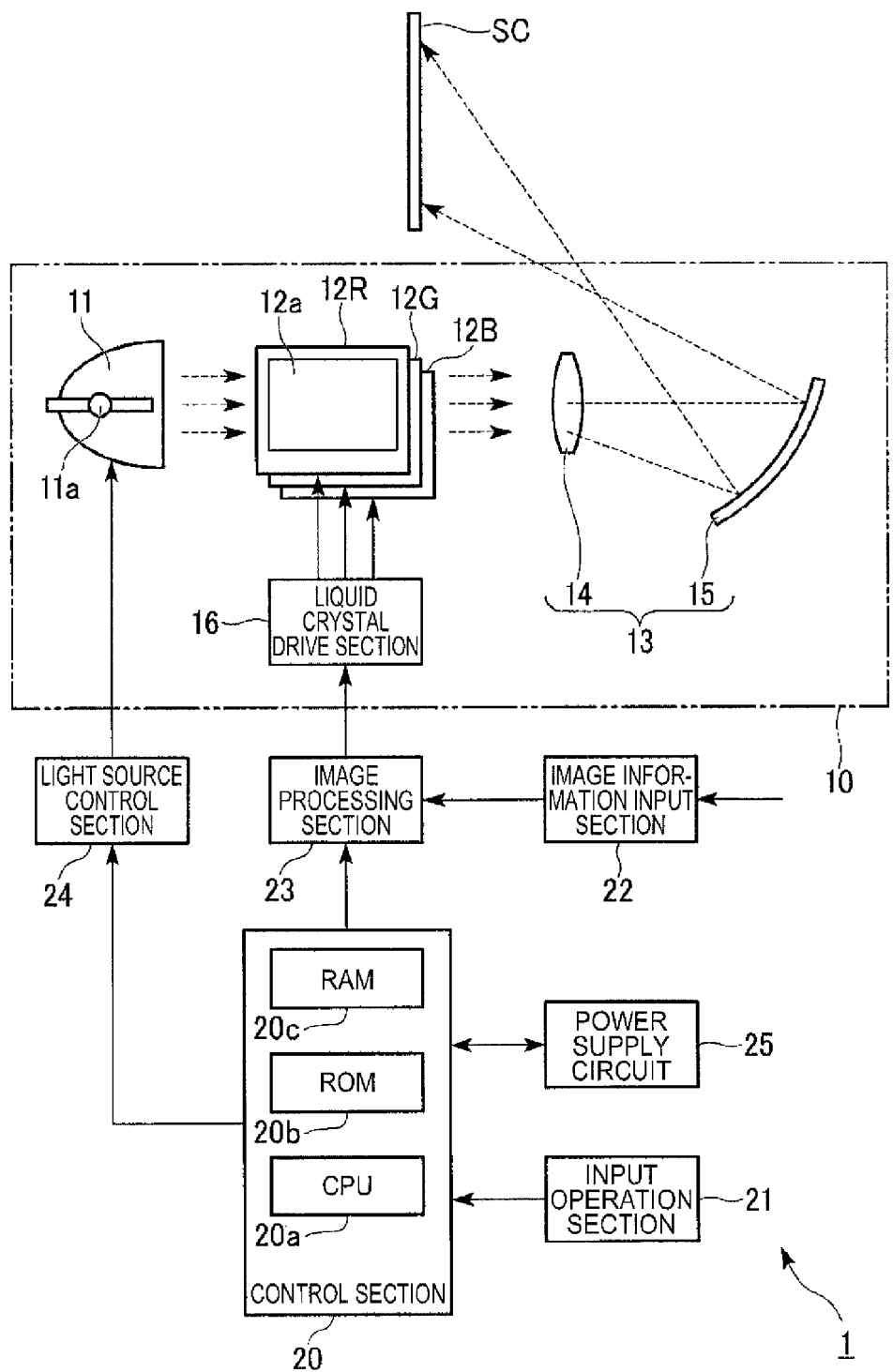
FIG. 1 is a schematic configuration diagram showing a projector according to an embodiment of the invention.

Hereinafter, a projector according to an embodiment of the invention will be explained with reference to the accompanying drawings.

It should be noted that the scope of the invention is not limited to the embodiments hereinafter described, but can arbitrarily be modified within the technical idea or the technical concept of the invention. Further, in the drawings hereinafter explained, the actual structures and the structures of the drawings might be made different from each other in scale size, number, and so on in order to make each constituent easy to understand.

Projector

FIG. 1 is a schematic configuration diagram showing a projector according to the present embodiment.

As shown in FIG. 1, the projector 1 is provided with a projection section 10, a control section (a guide display section) 20, an input operation section 21, an image information input section 22, an image processing section (the guide display section) 23, a light source control section 24, and a power supply circuit 25. In the present embodiment, the projector 1 is, for example, a stationary short focus projector.

The projection section 10 is provided with a light source device 11 as a light source, liquid crystal light valves (light modulation device) 12R, 12G, and 12B, a projection optical device (a projection optical system) 13, and a liquid crystal drive section 16. The projection section 10 modulates the light emitted from the light source device 11 with the liquid crystal light valves 12R, 12G, and 12B, and then projects the light with the projection optical device 13 to thereby display an image on a screen SC.

The light source device 11 is configured including a discharge light source lamp 11a formed of a super-high pressure mercury lamp, a metal halide lamp, or the like. The light emitted from the light source device 11 is converted into light having a substantially even luminance distribution by an integrator optical system not shown, and is separated into colored light components of red (R), green (G), and blue (B), the three primary colors of light, by a color separation optical system not shown, and then the colored light components enter the liquid crystal light valves 12R, 12G, and 12B, respectively.

The liquid crystal light valves 12R, 12G, and 12B are each formed of a transmissive liquid crystal panel or the like having a liquid crystal material encapsulated between a pair of transparent substrates. The liquid crystal light valves 12R, 12G, and 12B are each provided with a pixel area 12a having a rectangular shape with a plurality of pixels (not shown) arranged in a matrix, and arranged so that a drive voltage can be applied to the liquid crystal material pixel by pixel. Further, when the liquid crystal drive section 16 applies the drive voltage corresponding to the image information input thereto to each of the pixels, each of the pixels is set to have a light transmittance corresponding to the image information. Therefore, the light emitted from the light source device 11 is modulated color by color in accordance with the image information while being transmitted through the pixel area 12a of each of the liquid crystal light valves 12R, 12G, and 12B. The colored light beams thus modulated are combined with each other by a color combining optical system not shown.

The projection optical device 13 is configured including a lens 14 and a concave mirror 15 as a reflecting section, and performs the tilted projection of the light beams respectively modulated by the liquid crystal light valves 12R, 12G, and 12B on the screen SC while making the image light wide-angle using the concave mirror 15.

In the present specification, the "tilted projection" denotes the state in which the center of the image imaged on the lens 14 of the projection optical device 13 is shifted from the optical axis of the lens 14.

The control section 20 is provided with a central processing unit (CPU) 20a, a nonvolatile read only memory (ROM) 20b as a storage section for storing a control program, setting data, and so on, a random access memory (RAM) 20c used for temporarily storing data.

The control section 20 is a device functioning as a computer, and controls the operation of the projector 1 by the CPU 20a executing the control program stored in the ROM 20b to perform an arithmetic process while temporarily storing necessary information in the RAM 20c. Further, the ROM 20b stores image information (guide image information) for displaying a guide image Pg (see FIG. 3) used when installing the projector 1 described later.

The input operation section 21 is for receiving an input operation of the user, and is provided with a plurality of operation keys for the user to provide various instructions to the projector 1. When the user operates the various operation keys of the input operation section 21, the input operation section 21 receives the operation and then outputs a control signal corresponding to the operation key thus operated to the control section 20. Then, when the control signal is input from the input operation section 21, the control section 20 performs the process based on the control signal thus input to thereby control the operation of the projector 1.

It should be noted that it is also possible to adopt a configuration using a remote controller allowing a remote operation, and in this case, the remote controller also corresponds to the input operation section 21. Then, when the remote controller receives the input operation by the user, and then transmits an operation signal on an infrared ray corresponding to the operation content to the main body of the projector 1, a receiving section not shown receives the operation signal, and then transmits the operation signal to the control section 20.

The image information input section 22 is provided with a plurality of input terminals, and a variety of types of image information are input to these input terminals from an external image supply device not shown such as a video playback device or a personal computer. The image information input section 22 outputs the image information, which has been input to the image information input section 22, to the image processing section 23.

The image processing section 23 converts the image information, which is input from the image information input section 22, into the image information representing the grayscales of the respective pixels of the liquid crystal light valves 12R, 12G, and 12B, namely the image information for defining the drive voltages to be applied to the respective pixels. Here, the image information obtained by the conversion includes a plurality of pixel values corresponding to the respective pixels of the liquid crystal light valves 12R, 12G, and 12B. The pixel value is for determining the light transmittance of the corresponding pixel, and defines the luminance of the light emitted from the pixel. Further, the image processing section 23 performs, for example, an image quality adjustment process for adjusting the image quality such as the brightness, the contrast, the sharpness, and the color on the image information thus converted, and then outputs the image information thus processed to the liquid crystal drive section 16 based on the instruction of the control section 20.

Further, the image processing section 23 can output the guide image information stored in the ROM 20b instead of the image information described above to the liquid crystal drive section 16. When the control section 20 outputs the guide image information to the image processing section 23 to instruct the image processing section 23 to display the guide image Pg (see FIG. 3) described later, the image processing section 23 outputs the guide image information, which has been input to the image processing section 23, to the liquid crystal drive section 16 to make the projection section 10 project the light corresponding to the guide image Pg. As described above, the image processing section 23 can switch between the state of displaying the image (input image) based on the image information having been input to the image information input section 22 and the state of displaying the guide image Pg based on the guide image information in accordance with the instruction of the control section 20.

Subsequently, when the liquid crystal drive section 16 drives the liquid crystal light valves 12R, 12G, and 12B in accordance with the image information input from the image processing section 23, the light emitted from the light source device 11 is modulated by the liquid crystal light valves 12R, 12G, and 12B in accordance with the image information, and is then projected from the projection optical device 13.

The light source control section 24 controls lighting of the light source device 11 (the light source lamp 11a) based on the instruction of the control section 20. Specifically, the light source control section 24 is capable of supplying the light source lamp 11a with predetermined electrical power to thereby light the light source lamp 11a, and stopping the supply of the electrical power to thereby put off the light source lamp 11a.

The power supply circuit 25 is externally supplied with the commercial power (not shown) of, for example, 100 V AC. The power supply circuit 25 converts the commercial power (alternating-current power) into direct-current power with a predetermined voltage, and supplies each section of the projector 1 with the direct-current power. It should be noted that graphical description of supply channels to the respective sections will be omitted. Further, in accordance with the instruction of the control section 20, the power supply circuit 25 can switch between the state (the power ON state) of supplying each section with the power (the operation power) necessary for projecting the light and the state (the standby state) of halting the supply of the operation power and standing ready and waiting for the operation for switching the power ON.

Operation of Projector

When the projector 1 is supplied with the commercial power, the power supply circuit 25 supplies at least the control section 20 and the input operation section 21 with the standby power, and then the control section 20 starts the operation with the control program in response to the power supply. Immediately after the commercial power has been supplied, the projector 1 is in the standby state (also referred to as a "power-off state"), and is waiting for an operation (an ON operation) for switching the power ON in the state of keeping the light source lamp 11a OFF.

Figure 2:
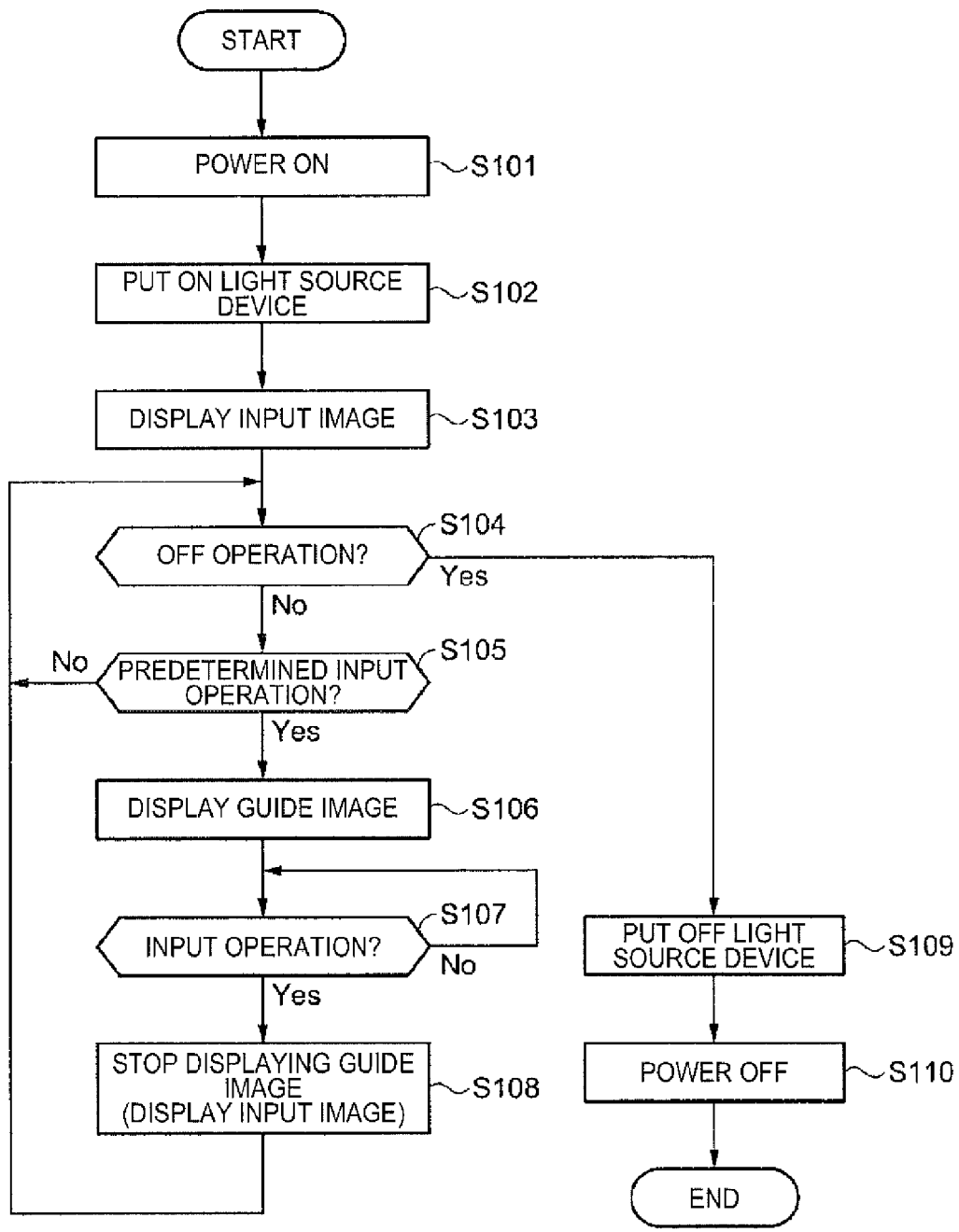
FIG. 2 is a flowchart showing an operation of the projector according to the embodiment.

FIG. 2 is a flowchart for explaining an operation of the projector 1 when the power is ON. When the user performs the ON operation in the standby state, the control section 20 operates along the flow shown in FIG. 2.

As shown in FIG. 2, in the step S101, the control section 20 instructs the power supply circuit 25 to start supplying each section with the operation power to thereby power ON the projector 1.

In the step S102, the control section 20 issues an instruction to the light source control section 24 to put ON the light source device 11 (the light source lamp 11a). Then, in the step S103, the control section 20 issues an instruction to the image processing section 23 to perform the image processing on the image information having been input to the image information input section 22 to thereby display the input image based on the image information. As a result, the light corresponding to the image information is projected from the projection section 10, and the input image is displayed on the screen SC.

In the step S104, the control section 20 determines whether or not an operation (an OFF operation) for switching the power OFF has been performed on the input operation section 21. Then, in the case in which the OFF operation has not been performed, the process proceeds to the step S105, and in the case in which the OFF operation has been performed, the process proceeds to the step S109.

In the case in which the OFF operation has not been performed and the process has proceeded to the step S105, the control section 20 determines whether or not a predetermined input operation for displaying the guide image Pg described later has been performed on the input operation section 21. Then, in the case in which the predetermined input operation has been performed, the process proceeds to the step S106, and in the case in which the predetermined input operation has not been performed, the process returns to the step S104.

In the case in which the predetermined input operation has been performed and the process has proceeded to the step S106, the control section 20 outputs the guide image information to the image processing section 23 to instruct the image processing section 23 to display the guide image Pg. Then, when the image processing section 23 outputs the guide image information to the liquid crystal drive section 16 in accordance with the instruction of the control section 20, the light corresponding to the guide image information is projected from the projection section 10, and the guide image Pg is displayed on the screen SC. After the guide image Pg is displayed on the screen SC, the process proceeds to the step S107.

It should be noted that in the present embodiment, the control section 20 and the image processing section 23 in the case of displaying the guide image Pg correspond to the guide display section.

In the step S107, the control section 20 determines whether or not some sort of input operation has been performed on the input operation section 21, namely whether or not any of the operation keys of the input operation section 21 has been operated. Then, if the input operation has been performed, the process proceeds to the step S108, and if the input operation has not been performed, the present step is repeated.

In the case in which some sort of input operation has been performed, and the process has proceeded to the step S108, the control section 20 issues an instruction to the image processing section 23 to halt the display of the guide image Pg, and restore the state of displaying the input image, and then the process returns to the step S104.

Further, in the case in which the OFF operation has been performed in the step S104, and the process has proceeded to the step S109, the control section 20 issues an instruction to the light source control section 24 to put OFF the light source device 11 (the light source lamp 11a). Then, in the step S110, the control section 20 issues an instruction to the power supply circuit 25 to stop supplying each section with the operation power to thereby power OFF the projector 1. In other words, the control section 20 makes the transition of the projector 1 to the standby state, and then terminates the flow.

Hereinafter, the guide image Pg displayed in the step S106 will be explained in detail.

Figure 3:
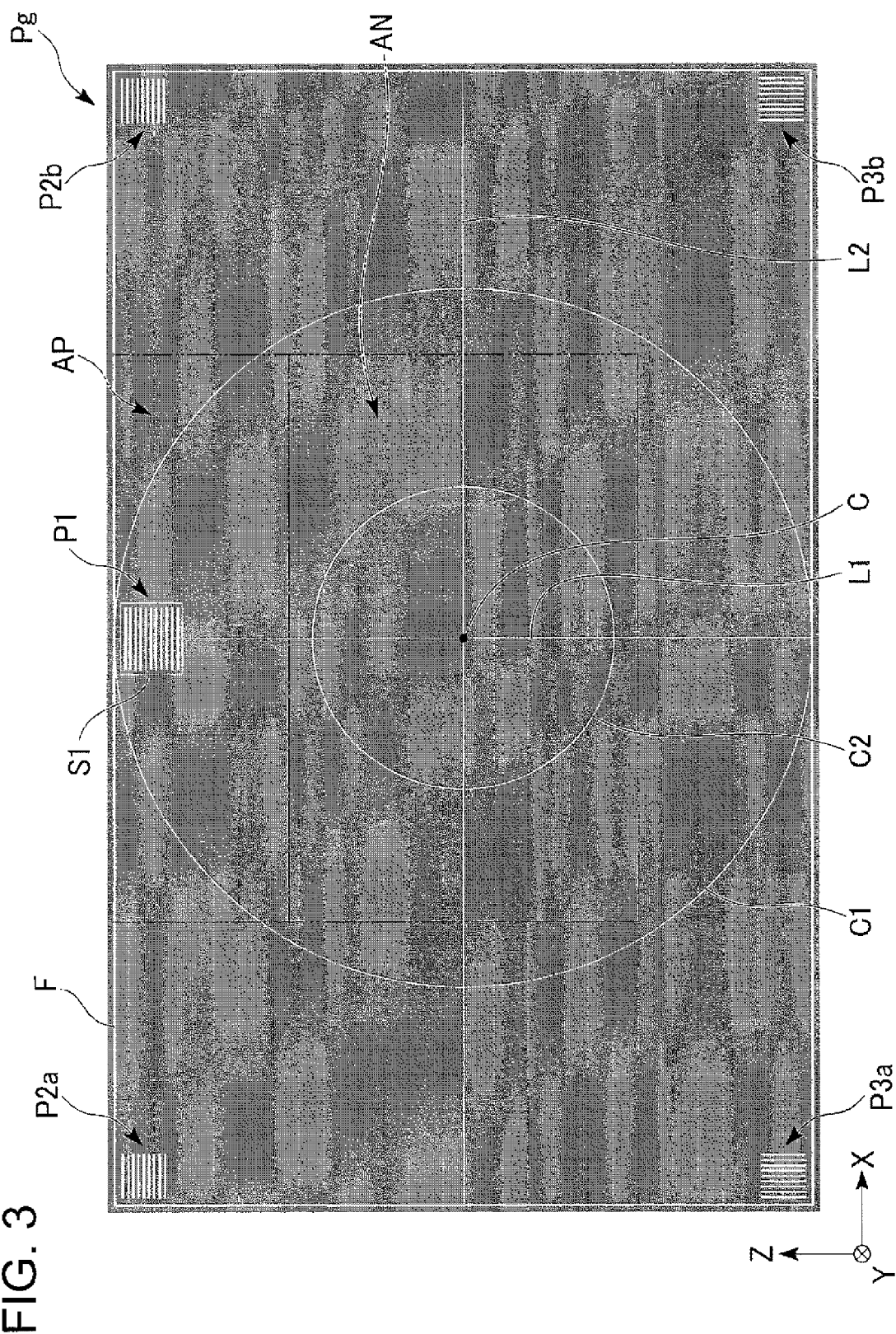
FIG. 3 is a diagram showing a guide image of the embodiment.
Figure 4:
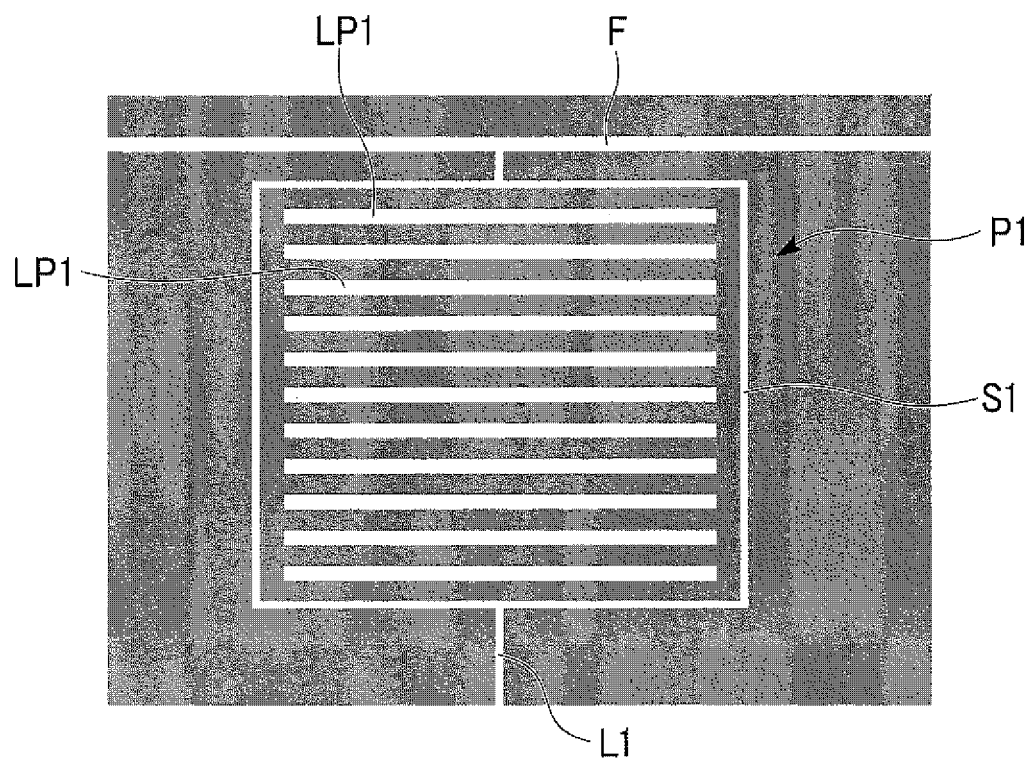
FIG. 4 is a partial enlarged view showing the guide image of the embodiment.
Figure 5:
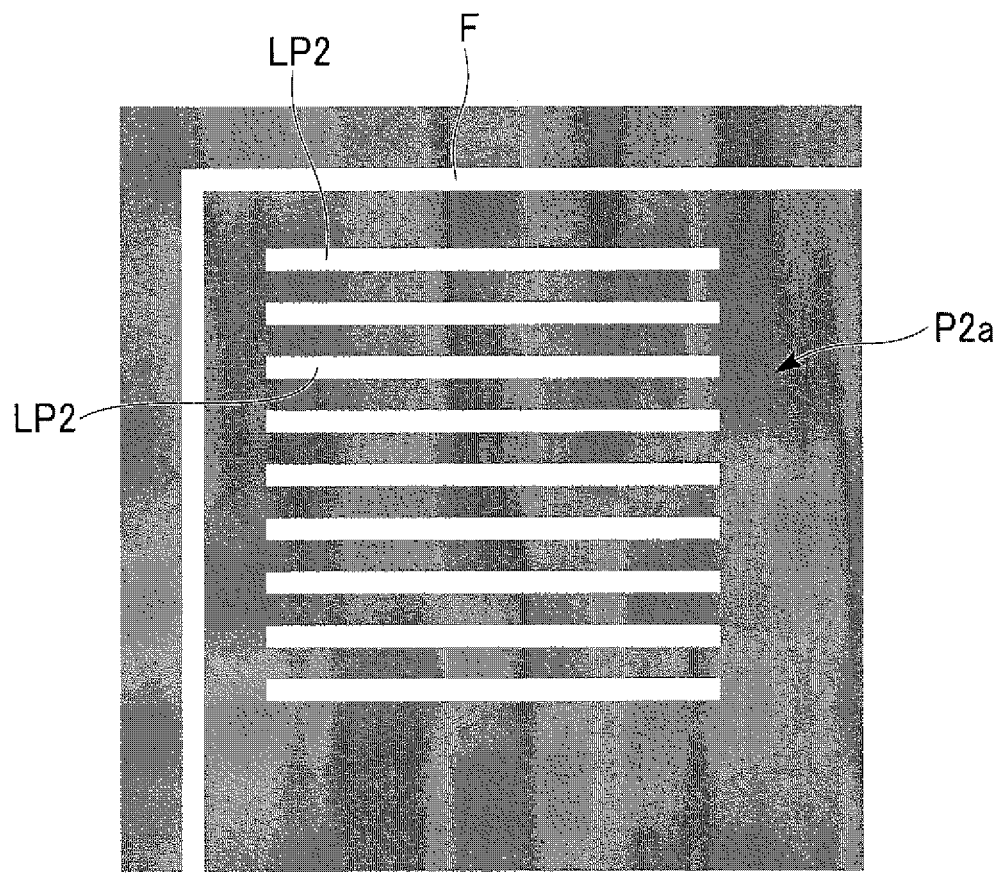
FIG. 5 is a partial enlarged view showing the guide image of the embodiment.
Figure 6:
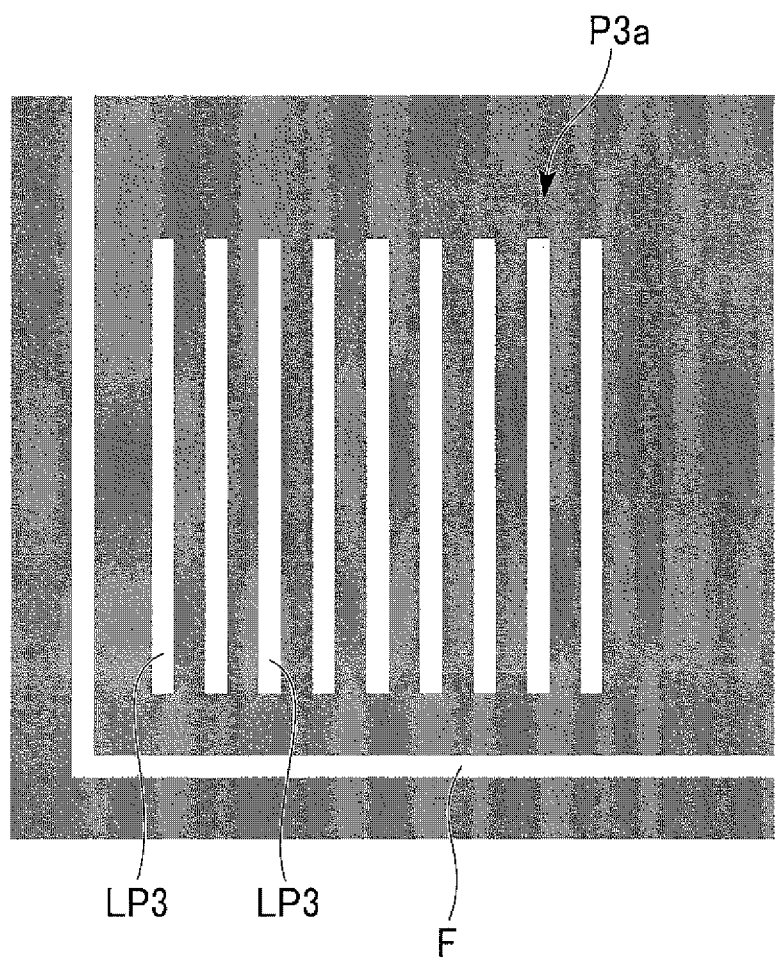
FIG. 6 is a partial enlarged view showing the guide image of the embodiment.

FIG. 3 is a diagram showing the guide image Pg. FIG. 4 is a partial enlarged view showing a focus adjustment pattern P1 of the guide image Pg. FIG. 5 is a partial enlarged view showing an upper auxiliary pattern P2a. FIG. 6 is a diagram showing a lower auxiliary pattern P3a.

It should be noted that in the following explanation, an XYZ coordinate system is provided, and positional relationships between the constituents will be explained with reference to the XYZ coordinate system. In this case, it is assumed that the vertical direction is a Z-axis direction, a direction perpendicular to the guide image Pg (the screen SC) is a Y-axis direction, and a direction perpendicular to the Z-axis direction and the Y-axis direction is an X-axis direction. The X-axis direction and the Y-axis direction are each a horizontal direction. Further, in the following explanation, the Z-axis direction is referred to as a vertical direction, and the X-axis direction is referred to as a horizontal direction, in some cases.

The guide image Pg is a projection image to be projected from the projector 1, and is an image for making the projection image fit to the screen SC. As shown in FIG. 3, the guide image Pg is a rectangular image formed in the entire area of the pixel area 12a, and includes a rectangular frame (a test pattern) F along the circumference, two vertical and horizontal center lines (test patterns) L1, L2, two circles (test patterns) (concentric circles) C1, C2 different in diameter from each other, the focus adjustment pattern P1, a frame-like pattern S1, upper auxiliary patterns (auxiliary patterns) P2a, P2b, and lower auxiliary patterns (auxiliary patterns) P3a, P3b.

In the central portion of the guide image Pg, the patterns used for the focus adjustment, namely the focus adjustment pattern P1, the frame-like pattern S1, the upper auxiliary patterns P2a, P2b, the lower auxiliary patterns P3a, P3b, are not disposed. In other words, in the central portion of the guide image Pg, there is disposed a non-focus adjustment pattern forming area AN. The non-focus adjustment pattern forming area AN is a rectangular area, in which a length in the horizontal direction (the X-axis direction) is half as long as the horizontal length of the guide image Pg, and a length in the vertical direction (the Z-axis direction) is half as long as the vertical length of the guide image Pg. The center of the non-focus adjustment pattern forming area AN coincides with the center C of the guide image Pg.

The center of the two circles C1, C2 coincides with the center C of the guide image Pg, namely the intersection between the two center lines L1, L2, and the circle C1 larger in diameter touches the upper and lower lines of the frame F.

The frame F, the center lines L1, L2, and the circles C1, C2 are figures (test patterns) for making the display state such as the tilt and the deformation (distortion) of the projection image corresponding to the support state of the projector 1 easy to recognize, and it is possible for the user to adjust the installation state of the projector 1 using the shape, the size, and the tilt of the figures as a guide.

The focus adjustment pattern P1 is a figure for adjusting the focus of the projection image projected from the projector 1. The focus adjustment pattern P1 is disposed in the central portion in the horizontal direction (the X-axis direction) of the peripheral zone in the tilt direction side (the +Z side) of the guide image Pg.

In the present embodiment, the peripheral zone in the tilt direction side of the guide image Pg denotes a part, in which a length downward in the vertical direction (toward the −Z direction) from the side located on the tilt direction side (the +Z side) is equal to or shorter than one fourth of the length in the vertical direction (the Z-axis direction) of the guide image Pg.

In the present embodiment, the central portion in the horizontal direction of the guide image Pg denotes a part, in which a length rightward in the horizontal direction (the X-axis direction) and a length leftward in the horizontal direction from the center line L1 are each equal to or shorter than one fourth of the length in the horizontal direction (the X-axis direction) of the guide image Pg.

In the present embodiment, the central portion in the horizontal direction in the peripheral zone on the tilt direction side of the guide image Pg is referred to as a focus adjustment pattern forming area AP. In other words, the focus adjustment pattern P1 is formed inside the focus adjustment pattern formation area AP.

Figure 7:
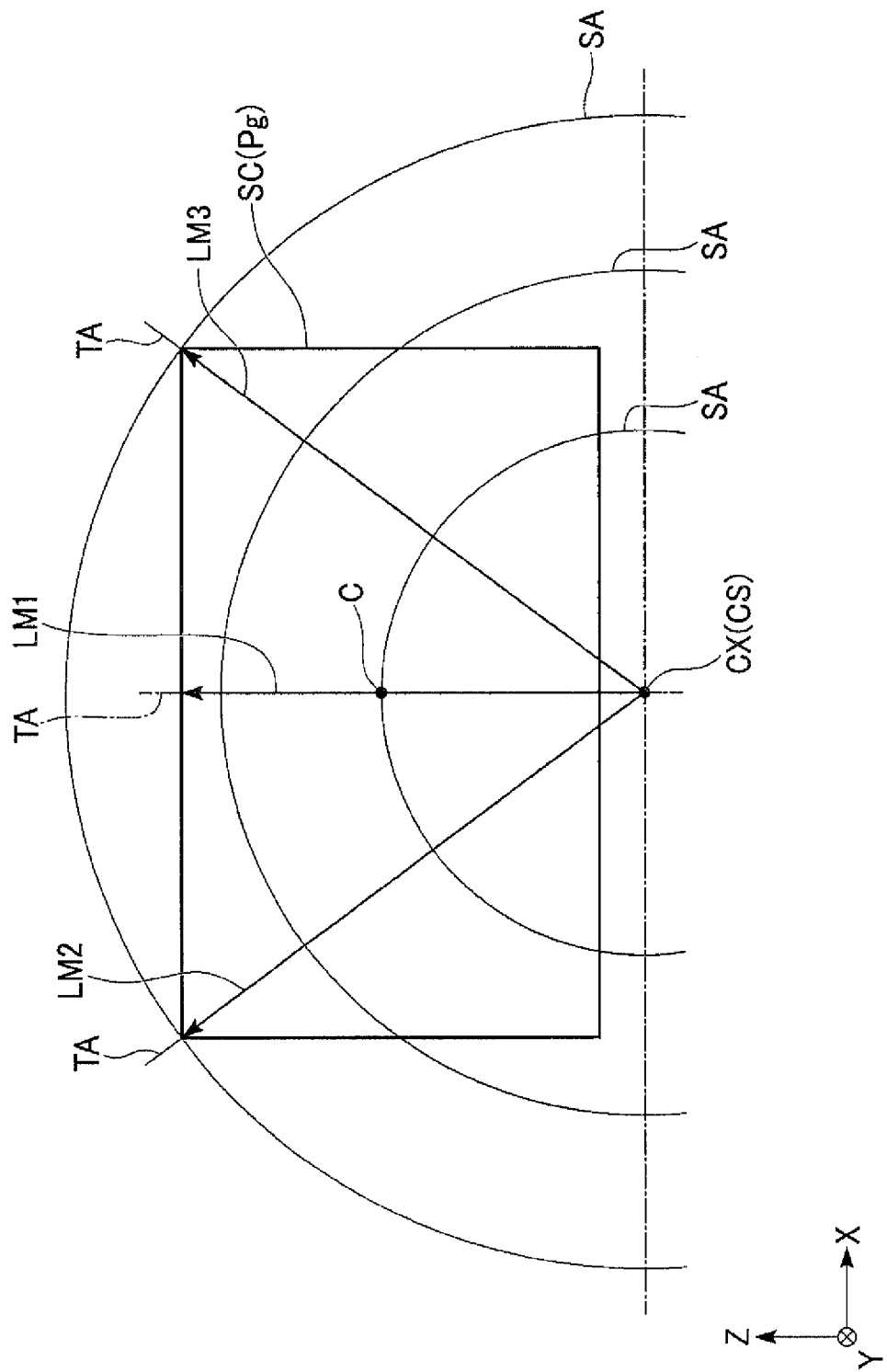
FIG. 7 is an explanatory diagram for explaining a relationship between a screen and light to be projected.
Figure 8:
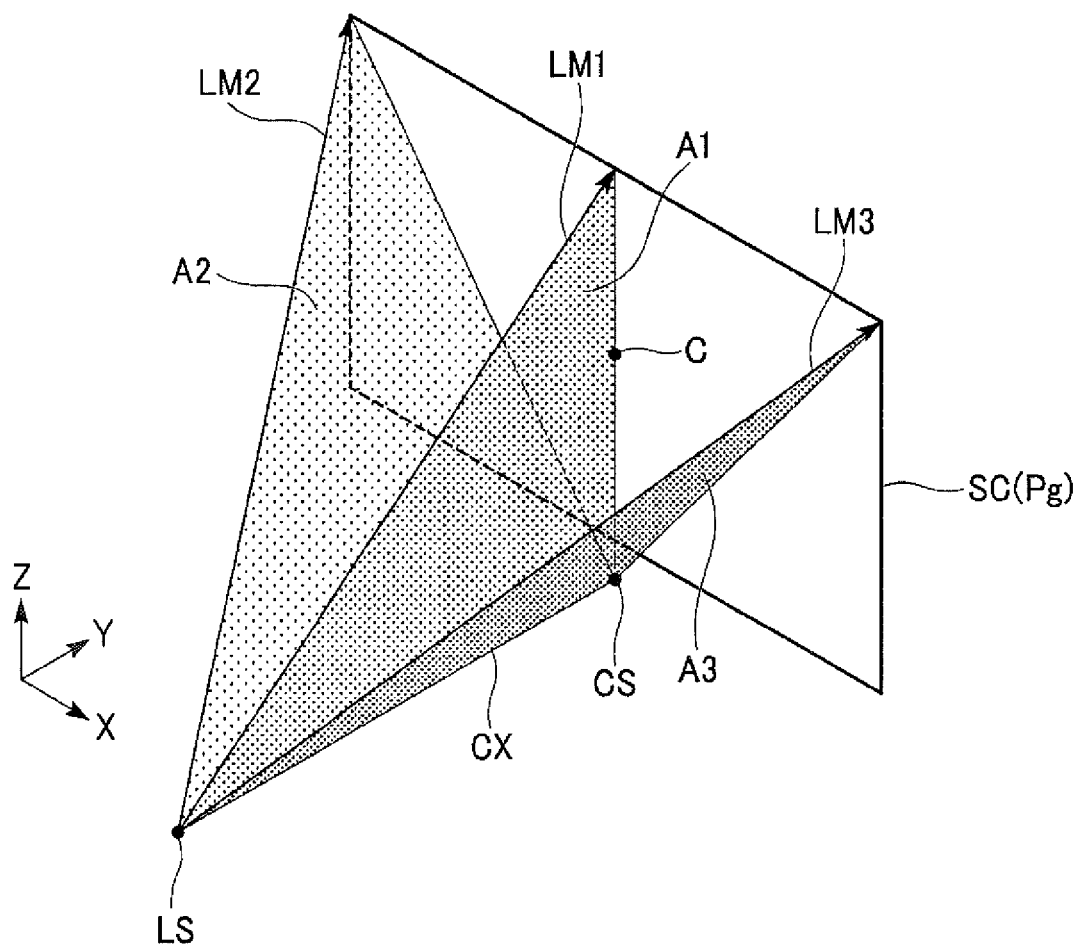
FIG. 8 is an explanatory diagram for explaining a relationship between the screen and the light to be projected.

Here, the "tilt direction" in the present specification denotes a direction from a point CS, at which an optical axis CX shown in FIGS. 7 and 8 and a plane including the screen SC intersect with each other, toward the center C of the guide image Pg. In other words, in the present embodiment, the "tilt direction" denotes upward in the vertical direction (the +Z direction).

FIGS. 7 and 8 are explanatory diagrams for explaining a relationship between the screen SC and the light to be projected.

In FIG. 7, the optical axis CX is a direction of the principal ray of the light passing through the optical axis of the lens 14 (see FIG. 1) of the projection optical device 13 after being reflected by the concave mirror 15 in the case of assuming that the light passing through the optical axis of the lens 14 is reflected by the concave mirror 15, and is then emitted from the projector 1.

As shown in FIG. 3, it is preferable for the focus adjustment pattern P1 to be disposed at the center in the horizontal direction (the X-axis direction) in the end portion on the upward in the vertical direction side (the +Z side) in the focus adjustment pattern forming area AP. In other words, it is preferable for the focus adjustment pattern P1 to be disposed at the center in the horizontal direction (the X-axis direction) of the end portion in the tilt direction side (the +Z side) in the guide image Pg. Since the focus adjustment pattern P1 is disposed in such a manner, it is possible for the user to more easily adjust the focus of the entire projection image.

As shown in FIG. 4, the focus adjustment pattern P1 includes a plurality of linear patterns (line segments) LP1.

The linear patterns LP1 are each a line segment extending in the horizontal direction (the X-axis direction), and are arranged side by side in the vertical direction (the Z-axis direction). The linear patterns LP1 have the same length as each other and are aligned in the position in the horizontal direction (the X-axis direction).

The linear patterns LP1 of the focus adjustment pattern P1 are longer than linear patterns LP2 of the upper auxiliary patterns P2a, P2b and the linear patterns LP3 of the lower auxiliary patterns P3a, P3b described later. Further, the number of the linear patterns LP1 arranged in the vertical direction (the Z-axis direction) is larger than the number of the linear patterns LP2 and the number of the linear patterns LP3. Therefore, the focus adjustment pattern P1 is larger in length in the vertical direction (the Z-axis direction) than the upper auxiliary patterns P2a, P2b and the lower auxiliary patterns P3a, P3b. In other words, the focus adjustment pattern P1 is formed to be larger in size than the upper auxiliary patterns P2a, P2b and the lower auxiliary patterns P3a, P3b.

The length in the vertical direction (the Z-axis direction) of the focus adjustment pattern P1, in other words, the length in a tangential direction described later, is set to be equal to or longer than a value 1/15 times as large as the length in the vertical direction (the Z-axis direction) of the guide image Pg, for example. According to the setting described above, it is easy for the user to visually recognize the focus adjustment pattern P1.

The frame-like pattern S1 is a figure having a rectangular ring-like shape surrounding the whole of the focus adjustment pattern P1.

The upper auxiliary patterns P2a, P2b and the lower auxiliary patterns P3a, P3b are figures for supplementarily adjusting the focus of the projection image adjusted using the focus adjustment pattern P1. The upper auxiliary patterns P2a, P2b and the lower auxiliary patterns P3a, P3b are respectively disposed on the four corners of the guide image Pg. Specifically, the upper auxiliary pattern P2a is disposed on the left side (the −X side) corner on the upward in the vertical direction side (the +Z side) in the guide image Pg. The upper auxiliary pattern P2b is disposed on the right side (the +X side) corner on the upward in the vertical direction side (the +Z side) in the guide image Pg. The lower auxiliary pattern P3a is disposed on the left side (the −X side) corner on the downward in the vertical direction side (the −Z side) in the guide image Pg. The lower auxiliary pattern P3b is disposed on the right side (the +X side) corner on the downward in the vertical direction side (the −Z side) in the guide image Pg.

As shown in FIG. 5, the upper auxiliary pattern P2a includes the plurality of linear patterns (line segments) LP2. The linear patterns LP2 are each a line segment extending in the horizontal direction (the X-axis direction), and are arranged side by side in the vertical direction (the Z-axis direction). The same applies to the upper auxiliary pattern P2b.

As shown in FIG. 6, the lower auxiliary pattern P3a includes the plurality of linear patterns (line segments) LP3. The linear patterns LP3 are each a line segment extending in the vertical direction (the Z-axis direction), and are arranged side by side in the horizontal direction (the X-axis direction). The same applies to the lower auxiliary pattern P3b.

The line width of the linear patterns LP1, LP2, and LP3 in the focus adjustment pattern P1, the upper auxiliary patterns P2a, P2b, and the lower auxiliary patterns P3a, P3b is preferably 3 dots (pixels) in the case of, for example, a full HD (high definition) image. In the focus adjustment, the thinner the line width is, the further the accuracy of the focus adjustment is enhanced, and therefor, the more preferable. However, in contrast, if the line width is too thin, it becomes unachievable to recognize the pattern in the case in which digital zooming or the keystone distortion correction has been performed. Therefore, by setting the line width to 3 dots, the line width can be thinned while making it possible to recognize the pattern even in the case of performing the digital zooming or the keystone distortion correction, and thus, the accuracy of the focus adjustment can be improved.

The linear patterns LP1, LP2, and LP3 in the focus adjustment pattern P1, the upper auxiliary patterns P2a, P2b, and the lower auxiliary patterns P3a, P3b can be different in line width from each other.

The linear patterns LP1, LP2, and LP3 in the focus adjustment pattern P1, the upper auxiliary patterns P2a, P2b, and the lower auxiliary patterns P3a, P3b are disposed so as to intersect with the tangential direction.

The tangential direction is defined as follows.

As shown in FIG. 8, assuming that the point, on which the light having been reflected by the concave mirror 15 (see FIG. 1) is once focused, is a point LS, it is possible to define tangential planes (meridional planes) A1, A2, and A3 respectively including principal rays LM1, LM2, and LM3 each radiated from the point LS and projected on the screen SC, and the optical axis CX. The tangential direction denotes a direction parallel to each of the tangential planes A1, A2, and A3. Therefore, on the screen SC, the direction of each of the straight lines TA shown in FIG. 7 corresponds to the tangential direction.

In the projection image, the image is apt to blur in the tangential direction. Therefore, it is preferable for the linear patterns LP1, LP2, and LP3 to be arranged in a direction perpendicular to the tangential direction, namely in parallel to a direction (a sagittal direction) of the curves SA shown in FIG. 7.

For example, in the present embodiment, the linear patterns LP1 are each disposed in a direction perpendicular to the tangential direction, namely so as to have the sagittal direction.

It should be noted that since the projection image is constituted by the pixels arranged in a matrix, it is no very meaningful to use oblique lines as the linear patterns in the case in which the tangential direction is oblique to the pixel arrangement. Therefore, regarding the place where the tangential direction is oblique to the pixel arrangement, the linear patterns can each be a line segment extending in the vertical direction (the Z-axis direction), or a line segment extending in the horizontal direction (the X-axis direction). It is preferable to select the linear patterns having the angle with the tangential direction nearer to 90°.

For example, in the present embodiment, since the tangential direction is a direction tilted by roughly 45° with respect to the vertical direction (the Z-axis direction) in the positions where the linear patterns LP2 are disposed, either of the vertical and horizontal line segments can be selected. In the present embodiment, for example, the horizontal line segments are selected as the linear patterns LP2.

Further, for example, in the present embodiment, since the tangential direction is a direction tilted a little with respect to the horizontal direction (the X-axis direction) in the positions where the linear patterns LP3 are disposed, the vertical line segments are selected as the linear patterns LP3.

In the guide image Pg, the frame F, the center lines L1, L2, the circles C1, C2, the focus adjustment pattern P1, the frame-like pattern S1, the upper auxiliary patterns P2a, P2b, and the lower auxiliary patterns P3a, P3b are displayed with, for example, a white color, and the rest of the area is displayed with, for example, a blue color. It is preferable for the color displayed to be set so that the contrast between the lines and the rest of the area is suitable to easily recognize each of the lines.

The user firstly performs the focus adjustment so as to achieve the focus on the focus adjustment pattern P1. Then, the user checks the balance of the focus on the four corners with reference to the upper auxiliary patterns P2a, P2b and the lower auxiliary patterns P3a, P3b respectively disposed on the four corners. In the case in which there is a difference in degree of focusing between the auxiliary patterns, the user fine-tunes the focus to achieve the state in which the degree of focusing is roughly the same between the auxiliary patterns on the four corners. Thus, the focus of the projection image can accurately and easily be achieved.

According to the present embodiment, since the focus adjustment pattern P1 is disposed at the center in the horizontal direction (the X-axis direction) of the end portion on the tilt direction side (the +Z side) in the guide image Pg, there can be obtained a projector allowing the user to easily adjust the focus of the image, the tilted projection of which is performed. Hereinafter, a detailed explanation will be presented.

Figure 9:
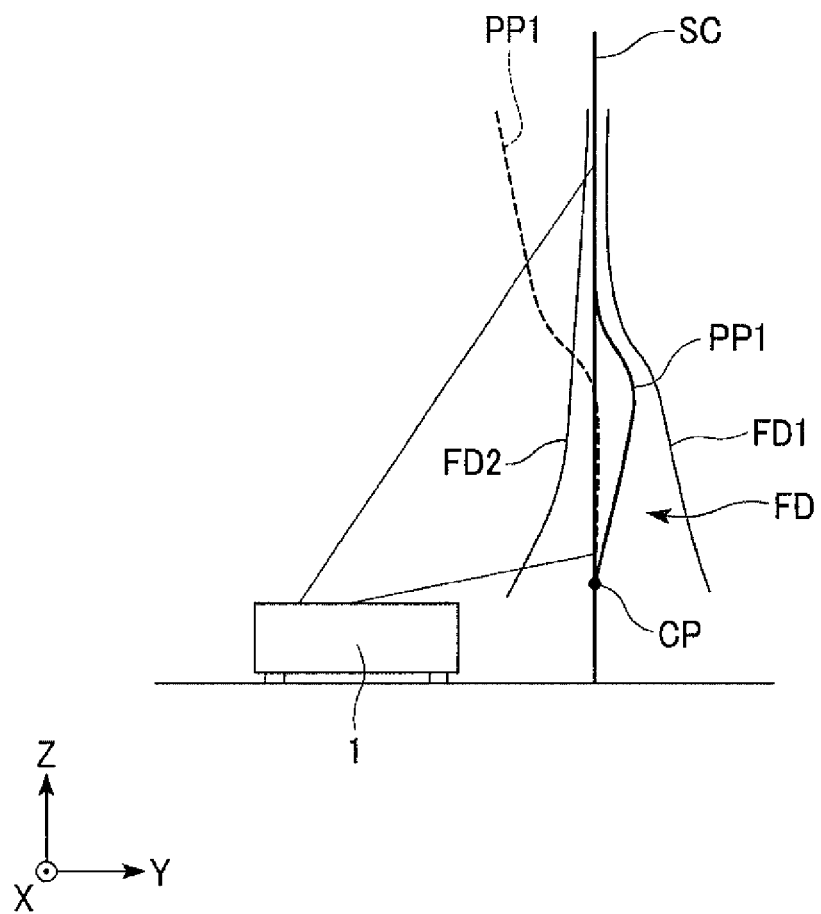
FIG. 9 is an explanatory diagram for explaining the advantage of the embodiment.

FIG. 9 is an explanatory diagram for explaining an image surface and the focus depth.

In order to eliminate all blurring portions in the entire projection image, it is necessary to adopt a configuration in which the entire image surface PP1 falls within a focus depth range FD.

The image surface denotes a surface configured by connecting the focal positions of the light projected from the projector, and preferably forms a flat surface from an ideal point of view. However, in reality, it is difficult to make the image surface flat, and as shown in FIG. 9, in many cases, the image surface PP1 becomes a curved surface with the center of the image curved. In the case in which the shape of the image surface becomes a curved surface, there is no chance for the image surface to completely overlap the screen SC as a flat surface. In other words, it is not achievable to obtain a configuration in which the focal position completely coincides in the entire projection image projected on the screen SC.

However, in reality, there is an allowable range in a range visually recognized by the user even though the focal position of the projection image does not completely coincide. The allowable range is referred to as the focus depth. For example, in the example shown in FIG. 9, if it is configured that the focal position falls within the focus depth range FD surrounded by a focus depth curve FD1 on an opposite side (the +Y side) to the projector 1 with respect to the screen SC and a focus depth curve FD2 on the projector 1 side (the −Y side) with respect to the screen SC, the deviation in the focal position is allowed in the range visually recognized by the user. In other words, if the focal position is set within the focal depth range FD, the user can recognize that the focus of the projection image is sufficiently achieved.

Here, since the focus depth becomes shallower in a direction toward the tilt direction side (the +Z side), the focus depth range FE becomes narrower in the direction toward the tilt direction side (the +Z side). This derives from such a principle as described below.

Figure 10:
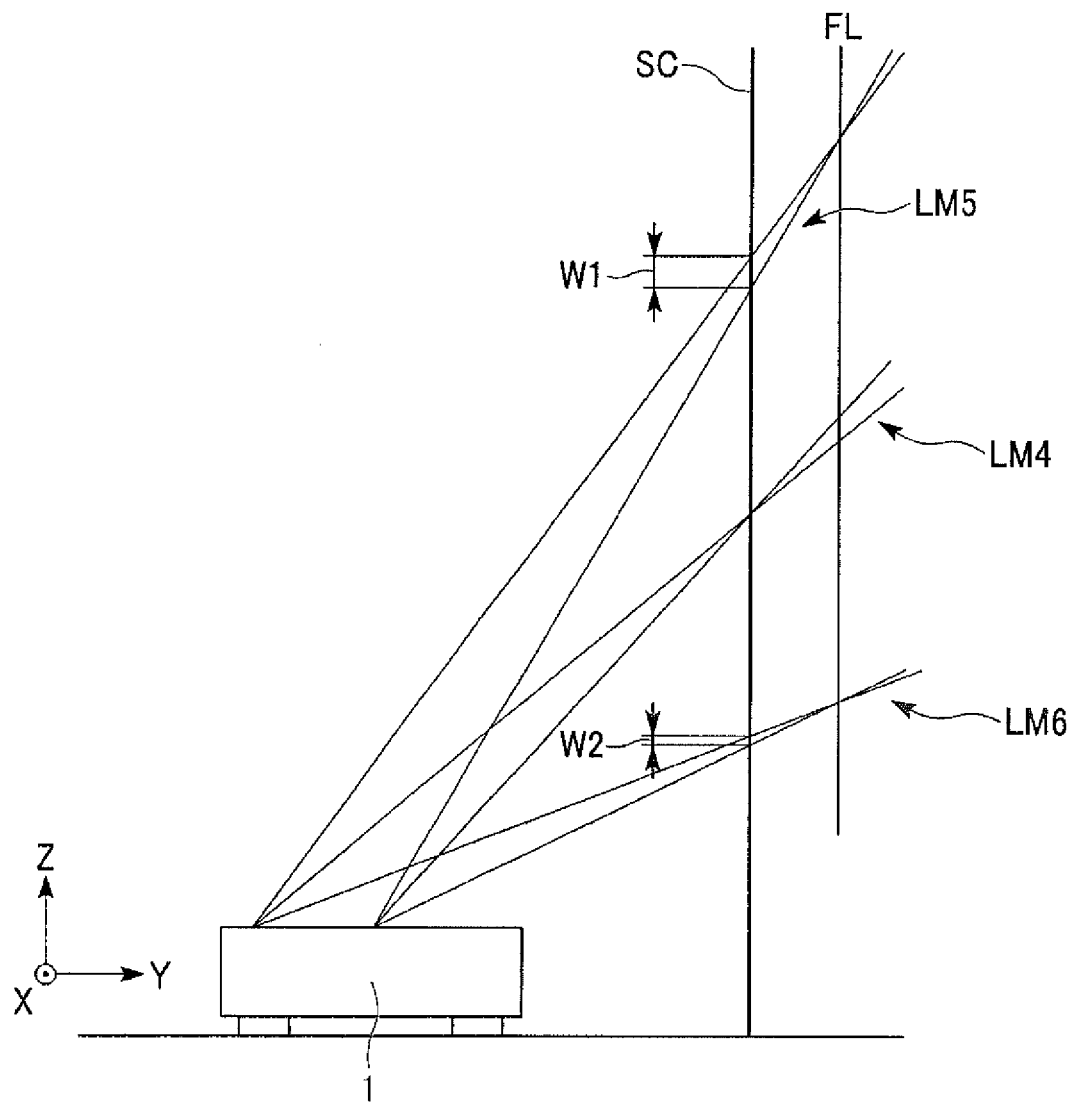
FIG. 10 is an explanatory diagram for explaining the advantage of the embodiment.

FIG. 10 is an explanatory diagram for explaining the focus depth.

As shown in FIG. 10, light LM4 is the light with the focal position set on the screen SC, light LM5 and light LM6 are each the light with the focal position set at a position FL located on the opposite side (the +Y side) to the projector 1 with respect to the screen SC.

In the light LM4, since the focal position is located on the screen SC, the light LM4 is collected on the screen SC, and a dot is imaged on the screen SC.

In contrast, in the light LM5 and the light LM6, since the position where the light is collected to form a dot is the position FL, it results that the light is imaged on the screen SC in a state of not sufficiently being converged. On this occasion, the longer the distance from the projector 1 is, namely the shorter the distance from the tilt direction side is, the larger the size of the spot imaged on the screen SC becomes. Specifically, the size W1 of the spot of the light LM5, which is located closer to the tilt direction side (the +Z side) than the light LM6, is larger than the size W2 of the spot of the light LM6. In other words, the light LM5 seems more blurring compared to the light LM6.

Therefore, the shorter the distance from the tilt direction side (the +Z side) is, the more easily the blur occurs in the case in which the focal position deviates from the surface of the screen SC, and the shorter the distance from the projector 1 side (the −Z side) is, the more difficult it is to cause the blur since the light is imaged in a state approximating to the dot even if the focal position deviates from the screen SC. Therefore, the focus depth becomes shallower in the direction toward the tilt direction side (the +Z side). As a result, the focus depth range FD becomes narrower in the direction toward the tilt direction side (the +Z side).

As shown in FIG. 9, since the image surface PP1 is curved in the central portion, if the adjustment is performed so that the focus is achieved at the center of the projection image in adjusting the focus of the projection image, the image surface PP1 runs off the focus depth range FD in the tilt direction side (the +Z side) as indicated by the dotted line, and the image blurs in the upper part of the projection image. In most cases, the user adjusts the focus with reference to the menu screen or the like displayed at the center of the projection image, and there is a problem that the projection image blurs on the tilt direction side, namely on the upward in the vertical direction side (the +Z side) in the present embodiment, although the focus is achieved at the center of the projection image.

In contrast, according to the present embodiment, it is possible for the user to adjust the focus of the projection image with reference to the focus adjustment pattern P1 in the focus adjustment pattern forming area AP disposed at the center in the horizontal direction of the end portion on the tilt direction side in the guide image Pg. Thus, it results that the entire image surface is included in the focus depth range FD as in the case of the image surface PP1 indicated by the solid line in FIG. 9, and the focus position is adjusted within the allowable range in the entire projection image. It should be noted that on this occasion, the image surface PP1 is varied in angle centered on the intersection CP between the optical axis and the screen SC.

Therefore, according to the present embodiment, since the focus of the entire projection image can be adjusted within the allowable range by adjusting the focus with reference to the focus adjustment pattern P1, there can be obtained a projector making it possible to easily adjust the focus of the projection image.

Further, for example, in the case in which the focus adjustment patterns are disposed in both end portions of the tilt direction side (the +Z side), namely at the positions of the upper auxiliary patterns P2a, P2b, it is necessary for the user to perform the focus adjustment while referring to the both end portions in the upper part of the projection image, and it takes time and effort to perform the focus adjustment. Further, in particular, in the short focus projectors, since the distance between the projector and the screen is short, if it is attempted to adjust the focus using the adjustment section provided to the projector, it is difficult to visually recognize the end portions in the horizontal direction (the X-axis direction) of the screen, and it is more difficult to perform the focus adjustment.

In contrast, according to the present embodiment, the single focus adjustment pattern P1 is formed alone in the focus adjustment pattern forming area AP disposed at the center in the horizontal direction (the X-axis direction) in the end portion on the tilt direction side (the +Z side) of the guide image Pg. Thus, it is possible for the user to perform the focus adjustment only by referring to the single focus adjustment pattern P1, which is easy and convenient.

Further, according to the present embodiment, since the focus adjustment pattern P1 is displayed at the center in the horizontal direction (the X-axis direction) with shorter distance from the projector 1, even in the case in which the distance between the projector 1 and the screen SC is short, it is easy to visually recognize the focus adjustment pattern F1, and the focus adjustment can more easily be performed.

Further, according to the present embodiment, the guide image Pg is provided with the frame-like pattern S1 surrounding the focus adjustment pattern P1. Therefore, according to the present embodiment, it is easy to visually recognize the focus adjustment pattern P1.

Further, according to the present embodiment, the focus adjustment pattern P1 is formed to be larger in size than the upper auxiliary patterns P2a, P2b and the lower auxiliary patterns P3a, P3b. Therefore, according to the present embodiment, it is easier to visually recognize the focus adjustment pattern P1.

Further, according to the present embodiment, since the upper auxiliary patterns P2a, P2b and the lower auxiliary patterns P3a, P3b of the guide image Pg are provided, it is possible to perform the focus adjustment using the focus adjustment pattern P1, and then fine-tune the overall balance. Thus, according to the present embodiment, the accuracy of the focus adjustment of the projection image can further be improved.

It should be noted that after performing the adjustment using the focus adjustment pattern P1, the focus of the entire projection image is within the sufficiently allowable range.

Further, according to the present embodiment, since the focus adjustment pattern P1, the upper auxiliary patterns P2a, P2b, and the lower auxiliary patterns P3a, P3b are provided to the guide image Pg, it is possible to perform the focus adjustment at the same time when performing the positioning of the projection image. Therefore, according to the present embodiment, the focus adjustment can be performed without switching the guide image Pg, which is easy and convenient.

Further, according to the present embodiment, the linear patterns LP1, LP2, and LP3 in the focus adjustment pattern P1, the upper auxiliary patterns P2a, P2b, and the lower auxiliary patterns P3a, P3b are disposed so as to intersect with the tangential direction. Therefore, according to the present embodiment, it is easy to recognize the defocus state, and thus the focus adjustment can easily be performed.

Further, according to the present embodiment, since the upper auxiliary patterns P2a, P2b and the lower auxiliary patterns P3a, P3b are disposed on the four corners of the guide image Pg, it is easy to recognize the positions of the four corners of the guide image Pg, and in adjusting the projection image to the screen SC, it is easy to adjust the position and the size of the projection image.

Further, according to the present embodiment, the patterns used for the focus adjustment is not formed in the central portion of the guide image Pg. In other words, in the central portion of the guide image Pg, there is formed the non-focus adjustment pattern forming area AN. Therefore, according to the present embodiment, it is possible to inhibit the user from referring to the central portion of the guide image Pg by mistake to perform the focus adjustment.

It should be noted that in the present embodiment, it is also possible to adopt the following configurations.

In the present embodiment, it is not necessarily required to dispose the upper auxiliary patterns P2a, P2b and the lower auxiliary patterns P3a, P3b.

Further, although in the embodiment described above it is assumed that either of the vertical and horizontal line segments is used as the linear pattern in the place where the tangential direction is oblique, the invention is not limited to this configuration. In the present embodiment, the linear patterns LP2 and the linear patterns LP3 can each include both of the vertical light segment and the horizontal line segment.

Further, although in the embodiment described above, it is assumed that the projector 1 is the stationary projector in which the tilt direction side coincides with the upward in the vertical direction side, the invention is not limited to this configuration. In the present embodiment, a ceiling mount projector can also be adopted. In this case, since the tilt direction side coincides with the downward in the vertical direction side, the focus adjustment pattern is disposed at the center of the end portion on the downward in the vertical direction side in the guide image Pg.

Further, although in the present embodiment, the short focus projector using the concave mirror is cited, the application of the invention is not limited to this type of projector. In particular, in the short focus projector using the concave mirror explained as the present embodiment, and a short focus projector, in which a mirror is not used, and the angle formed between the optical axis CX of the projection lens and the principal ray in the end portion on the tilt direction side of the projection image projected on the screen SC is equal to or larger than 45 degrees, since the curvature of the image surface is high, it can be said that it is advantageous to apply the invention.

The entire disclosure of Japanese Patent Application No. 2014-004896, filed Jan. 15, 2014 is expressly incorporated by reference herein.

What is claimed is:
1. A projector comprising:
a light source device;
a light modulation device adapted to modulate light from the light source device to form image light;
a projection optical system adapted to perform tilted projection of the image light input from the light modulation device to display an image; and
a guide display section adapted to display a guide image used for fitting the image projected by the projection optical system to a screen,
wherein the guide image is provided with a focus adjustment pattern forming area disposed in a central portion in a direction perpendicular to a tilt direction in a peripheral zone on the tilt direction side, and wherein the peripheral zone is a part, in which a length downward in a vertical direction from a side located on a tilt direction side is equal to or shorter than one fourth of the length in a vertical direction of the guide image, and a focus adjustment pattern is formed in the focus adjustment pattern forming area, wherein the focus adjustment pattern includes a line segment intersecting with a tangential direction.

2. The projector according to claim 1, wherein the line segment is perpendicular to the tangential direction.

3. The projector according to claim 1, wherein
the guide image has a rectangular shape, and
the guide image includes an auxiliary pattern adapted to supplement a focus adjustment disposed on four corners of the guide image.

4. The projector according to claim 3, wherein
the auxiliary pattern includes a line segment intersecting with a tangential direction.

5. The projector according to claim 3, wherein
the focus adjustment pattern is larger than the auxiliary pattern.

6. The projector according to claim 1, wherein
the guide image includes a non-focus adjustment pattern forming area disposed in a central portion of the guide image.

7. The projector according to claim 1, wherein
the guide image includes a frame-like pattern surrounding the focus adjustment pattern.

8. The projector according to claim 1, wherein
the guide image includes a test pattern adapted to make a display state of the image easy to recognize.

9. The projector according to claim 1, wherein
the projector is a short focus projector.

10. The projector according to claim 1, wherein
the focus adjustment pattern is disposed at the center in the horizontal direction of an end portion in a tilt direction side in the guide image.

11. The projector according to claim 1, wherein
the display of the guide image is configured to allow adjustment of the image to fit the screen, and the focus adjustment pattern is configured to allow focus adjustment to be achieved at the same time as the adjustment of the image to fit the screen.

* * * * *